March 10, 1964   C. J. HILLMAN   3,124,366
RING-TYPE GASKET
Filed June 7, 1961
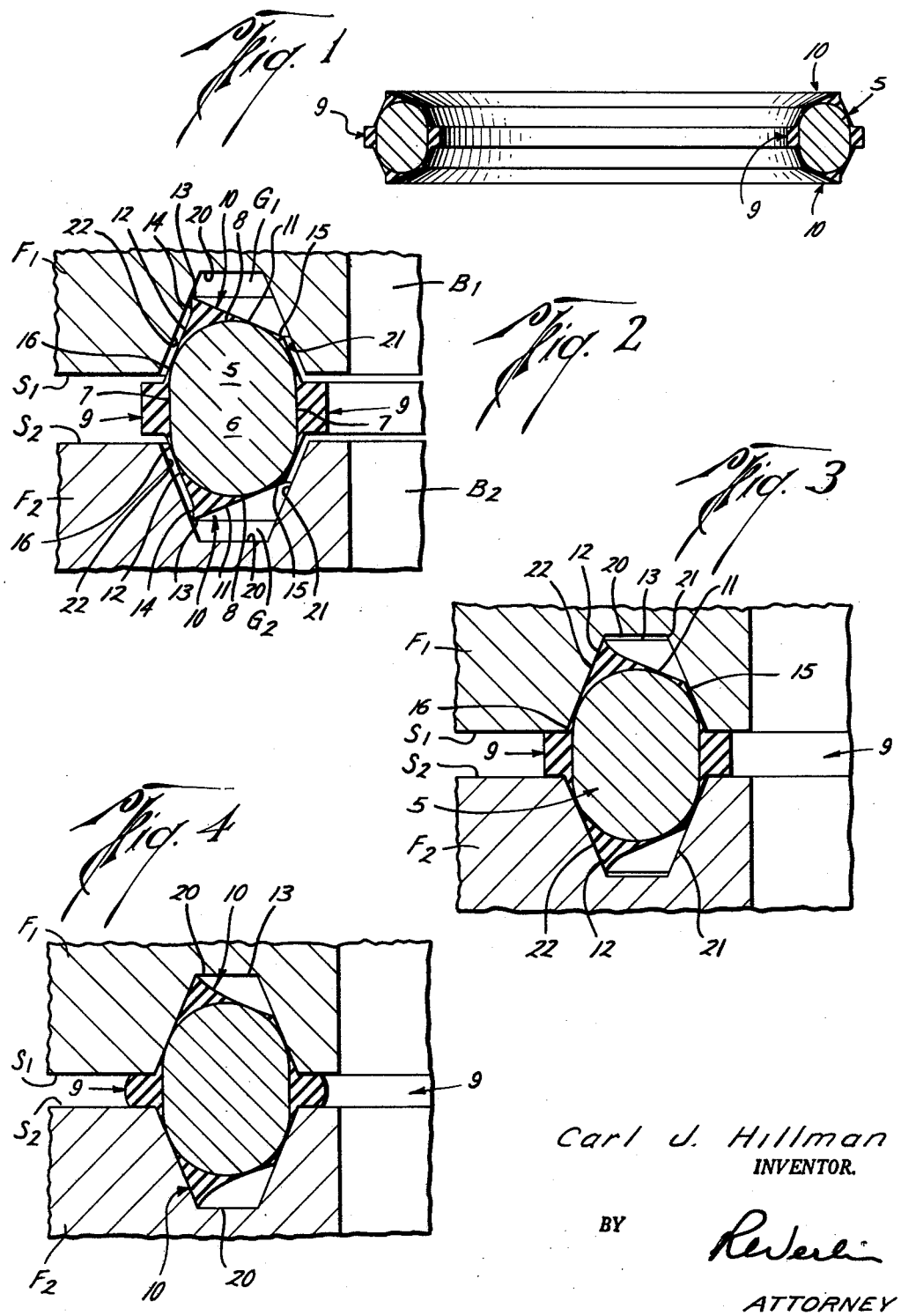
Carl J. Hillman
INVENTOR.
BY
ATTORNEY Patented Mar. 10, 1964

3,124,366
RING-TYPE GASKET
Carl J. Hillman, % Rubber Oil Well Products Co., 7623 Katy Road, Houston, Tex.
Filed June 7, 1961, Ser. No. 115,448
11 Claims. (Cl. 277—180)

This invention relates to a ring-type sealing gasket, and more particularly to improvements in a gasket of the type adapted to be received in opposed grooves which are provided in the parts of a joint between which a fluid-tight connection is to be made.

In joints between parts subjected to high fluid pressures, as in high pressure piping, oil and gas wellhead fittings, other pressure vessels, and the like, the connections generally comprise matching flanges adapted to be secured together by bolts. To seal between the flanges the opposed faces of the latter are conventionally provided with opposing grooves, which have a truncated V-shape in cross-section, adapted to receive a relatively rigid metal gasket or seal ring, the body of which is generally oval in cross-section, having a generally flat medial portion and convexly curved end portions. The curved end portions of the ring project into the opposed grooves so that points on the curved surfaces of the ring engage points on opposite walls of the respective grooves to form metal-to-metal seals between the ring and the walls of the grooves when the parts are drawn together.

The dimensions of the grooves and of the elements of the ring are generally made in accordance with established A.P.I. and A.S.A. standards, varying with the size of the joint, and the pressure and temperature conditions to which the joint is to be subjected.

The present invention has for its primary object an improved form of gasket or seal ring for use in joints of the general character described, which will provide increased assurance against leakage and protection against corrosion which frequently occurs in conventional metal ring gaskets and the engaged surfaces of the groove.

In accordance with the present invention, the gasket contemplates a combination structure comprising a metal body ring of standard or conventional shape, to the exterior of which is molded non-metallic packing elements, composed of rubber or other resilient composition material, the packing elements having specific shapes particularly adapted to accomplish the primary object of this invention.

In accordance with one embodiment of this invention, the packing elements include (a) a pair of annular ribs extending from the midportion of the inner and outer peripheries of the body ring and having a generally rectangular shape in axial cross-section, and (b) a pair of generally triangular ribs extending generally longitudinally of the body ring from the curved end portions thereof, the apex of each triangular rib being off-set toward the outer periphery of the body ring, thereby defining an oblique triangular shape, having its shorter or outer side adjacent the outer periphery of the body ring. The outer side of each triangular rib may be undercut slightly from the apex so that the apex portion defines an outwardly turned marginal lip. The several ribs having the described shapes are designed to cooperate with the wall surfaces of the receiving grooves and with the adjacent surfaces of the joint parts to supplement the sealing function of the body ring.

For convenience in molding the packing elements about the metal body ring, the several ribs will be joined by relatively thin webs of the resilient material, which will also be molded to the surface of the body ring, so that in the completed structure the metal body ring will be completely encased by a continuous body of the resilient material, the latter having the several ribs of the described configurations molded therein.

Other and more specific objects and advantages of this invention will become apparent from the following detailed description when read in conjunction with the accompanying drawing which illustrates one useful embodiment in accordance with this invention.

In the drawing:

FIG. 1 is a cross-sectional view of the gasket in accordance with this invention;

FIG. 2 is a fragmentary view showing the gasket in position for sealing engagement between a pair of joint parts before the parts are drawn together;

FIG. 3 is a view similar to FIG. 2, showing the relation of the gasket portions to the joint parts at an intermediate stage in the tightening of the joint; and FIG. 4 is a view similar to FIGS. 2 and 3, showing the several portions of the gasket in the positions occupied upon the complete tightening of the joint.

Referring to the drawing, the gasket comprises a relatively rigid body ring 5, constructed of a relatively rigid metal, such as iron or steel, and comprising an annular medial segment 6 having flat parallel inner and outer peripheral surfaces 7—7, and convexly curved end segments 8—8, thereby defining a body ring of generally oval or elliptical shape. A body of resilient non-metallic packing material is molded about the exterior of the body ring, the material being molded to define a plurality of annular sealing elements of specialized shapes disposed about the exterior of the body ring. These sealing elements comprise a pair of annular ribs 9—9, generally rectangular in cross-section, projecting radially from the mid-portions of peripheral surfaces 7—7, and a pair of annular ribs 10—10, generally triangular in cross-section, projecting outwardly from the opposite end portions 8—8 of the body ring, generally longitudinally thereof.

Each of the ribs 10—10 comprises inner and outer sides 11 and 12, respectively, converging to an apex 13, these ribs being disposed so that each apex 13 is offset from the vertical center of the body ring toward the outer periphery thereof, thereby defining oblique triangles with respect to a horizontal plane parallel to the plane of the body ring. The degree to which apex 13 is thus offset is the same for each rib. Outer side 12 of each rib is undercut slightly from a point adjacent apex 13 to define an outwardly turned marginal lip 14 about the apex portion of the rib. Webs 15 connect inner sides 11 of ribs 8 with the inner radial rib 9, while webs 16 connect outer sides 12 of ribs 8 with the outer radial rib 9.

FIGS. 1, 2 and 3, show the gasket in accordance with this invention positioned for sealing between opposed parts $F_1$ and $F_2$ which may be portions of annular mating flanges, having the registering bores $B_1$ and $B_2$ (shown in part) and adapted to form a joint between two pipe sections, pressure vessel closures, or the like (not shown). It will be understood that flanges $F_1$ and $F_2$ are adapted to be drawn together by bolts or other conventional securing devices (not shown) to accomplish a tight connection therebetween. The flanges $F_1$ and $F_2$ are provided with opposed annular gasket-receiving grooves $G_1$ and $G_2$ of generally conventional truncated V-shape defined by a bottom wall 20 and outwardly slanting inner and outer side walls 21 and 22, respectively. Grooves $G_1$ and $G_2$ open toward the opposed faces $S_1$ and $S_2$ of flanges $F_1$ and $F_2$ and are in registration with each other.

As seen in FIG. 2, the gasket is disposed in the receiving grooves, the flanges $F_1$ and $F_2$ being in the positions they occupy before tightening of the flanges is begun. At this stage in the forming of the connection, it will be seen that only the marginal lips 14 of the triangular ribs are in engagement with the outer walls 22 of the grooves.

As flanges $F_1$ and $F_2$ are drawn toward each other, as seen in FIG. 3, the opposed surfaces $S_1$ and $S_2$ of the flanges have moved close enough to each other to now engage the adjacent surfaces of radial ribs 9—9. The movement of the flanges toward each other will also bring outer walls 22 of the grooves into compressive sealing engagement with the outer sides 12 of ribs 10 throughout the length of these sides, lip 14 being forced inwardly by the pressure thus exerted on the outer sides of the ribs. Moreover, the apex 13 of each of the triangular ribs now closely approaches bottom wall 20 of the grooves, while webs 15 and 16 are in engagement with walls 21 and 22, respectively. At this stage of engagement of the parts, points on end portions 8—8 of body ring 5 will be substantially in contact with both walls of each groove.

In FIG. 4 the parts are shown in the positions occupied when the flanges have been fully tightened. It will be seen that the spacing between the flanges has now been reduced to a distance less than the thickness of radial ribs 9—9, so that the latter will be compressed and distended radially, as shown. At the same time, ribs 8 will be inwardly compressed to a point at which the apex 13 of each of the triangular ribs will be in engagement with bottom walls 20 of the grooves. The packing material comprising ribs 10 will thus, in effect, substantially fill the spaces between the rounded ends of the body ring and the walls of the grooves. The further movement of the flanges toward each other in effecting the tightening will generally slightly deform the body ring at the points of contact with the side walls of the grooves, so as to effect substantially complete metal-to-metal sealing at these points. However, fluid pressure attempting to escape from the interior of the vessel between the flanges $F_1$, $F_2$, as indicated by the arrow in FIG. 4, will first be opposed by the seal formed between the opposed faces $S_1$ and $S_2$ of the flanges and the inner radial rib 9, and should there be leakage between these elements so that the fluid enters the portions of the grooves interiorly of the inner sides of ribs 10, this pressure will be exerted against the inner sides 11 of these ribs, thus increasing the tightness of their engagement with the outer side walls of the grooves and assuring against leakage of fluid to the exterior of the joint. The seal effected by means of the radial rib between the flange surfaces also serves to keep the confined fluid from contact with the metal surfaces of the body ring and the surfaces in the grooves which are engaged with the body ring, thereby reducing the danger of corrosion on these metal surfaces and thus further protecting the joint against leakage. The flexibility of lips 14 defining the apex portions of the triangular ribs aids greatly in assuring effective seals of the ribs against the downstream sides of the grooves.

It will be evident that the gasket constructed in accordance with this invention will be installed in all cases so that the triangular ribs will be slanted or offset toward the downstream side of the gasket.

It will be noted that the triangular configurations of ribs 10 will provide free space between the ribs and the bottoms and inner side walls of grooves 20 for expansion or cold flow of the packing material comprising the ribs under the compression by the flanges.

By thus combining a conventional metal body ring with a flexible casing having the rib configuration illustrated and described herein, it will be seen that a double seal arrangement will be effected between the joint parts, one seal being the usual metal-to-metal seal formed by the engagement of the metal body ring with the walls of the grooves, and the second or supplemental seal being provided by the several ribs through their compressive engagement with the walls of the grooves and the adjacent portions of the opposed flange surfaces.

In some cases, effective sealing may be obtained with a modified form of the gasket in which only the oblique triangular ribs 10—10 are molded on the body ring, and the present invention contemplates such a modification.

It will be understood that other changes may be made in the details of the illustrative embodiment within the scope of the appended claims, but without departing from the spirit of this invention.

What I claim and desire to secure by Letters Patent is:

1. A gasket adapted to form a seal between two opposed parts having inwardly facing grooves, said gasket, comprising, an annular relatively rigid body having portions receivable in the grooves in engagement with the opposite walls thereof, annular ribs extending radially from the inner and outer peripheries of said body for compression between the portions of the opposed parts adjacent said grooves, oblique triangular annular ribs projecting from the ends of said body toward the bottoms of said grooves, said triangular ribs being offset toward the outer periphery of said body whereby to be compressively engaged by the outer side walls of said grooves throughout the entire areas of said outer side walls between the body and the bottoms of the grooves as the parts are drawn toward each other, all of said ribs comprising resilient packing material molded to the surface of said body.

2. A gasket adapted to form a seal between two opposed parts having inwardly facing grooves, said gasket, comprising, an annular relatively rigid body having portions receivable in the grooves in engagement with the opposite walls thereof, annular ribs extending radially from the inner and outer peripheries of said body for compression between the portions of the opposed parts adjacent said grooves, oblique triangular annular ribs projecting from the ends of said body toward the bottoms of said grooves, said triangular ribs being offset toward the outer periphery of said body whereby to be compressively engaged by the outer side walls of said grooves throughout the entire areas of said outer side walls between the body and the bottoms of the grooves as the parts are drawn toward each other, all of said ribs comprising resilient packing material molded to the surface of said body, the apex portions of said triangular ribs defining outwardly turned marginal lips.

3. A gasket according to claim 3 having webs constructed of said resilient packing material forming continuous connections between the respective ribs and molded to the surface of said body.

4. A gasket adapted to form a seal between two opposed parts having inwardly facing grooves, said gasket, comprising, an annular relatively rigid body of generally elliptical cross-section comprising a medial portion having relatively flat parallel inner and outer peripheries and convexly curved end portions receivable in the grooves in engagement with the opposite walls thereof, annular ribs of generally rectangular cross-section extending radially from the inner and outer peripheries of said medial portion of said body for compression between the portions of the opposed parts adjacent said grooves, annular end ribs projecting from said end portions of said body toward the bottoms of said grooves, said end ribs having oblique triangular shape in cross-section offset toward the outer periphery of said body whereby to be compressively engaged by the outer side walls of said grooves throughout the entire areas of said outer side walls between the body and the bottoms of the grooves as the parts are drawn toward each other, all of said ribs comprising resilient packing material molded to the surface of said body.

5. A gasket according to claim 4 wherein the apex portions of said triangular end ribs define marginal lips which project outwardly with respect to the outer sides of said end ribs.

6. A gasket adapted to form a seal between two opposed parts having inwardly facing grooves, said gasket, comprising, an annular relatively rigid metal body generally elliptical in cross-section, annular ribs generally rectangular in cross-section extending radially from the inner and outer peripheries of said body, annular ribs triangular in cross-section projecting from the ends of said body, said triangular ribs being obliquely offset toward the outer periphery of said body to position sides of the triangular ribs for sealing engagement with the outer walls of the grooves throughout the entire extent of said outer walls between the body and the bottoms of the grooves, all of said ribs comprising resilient packing material molded to the surface of said body.

7. A gasket according to claim 6 wherein the apex portions of said triangular ribs define marginal lips which project outwardly with respect to the outer sides of said triangular ribs.

8. A gasket adapted to form a seal between two opposed parts having inwardly facing grooves, said gasket comprising, an annular relatively rigid metallic body generally elliptical in cross-section, resilient packing material completely enclosing said body and molded to the surface thereof, said packing material being molded to define a first pair of annular ribs generally rectangular in cross-section projecting radially from the inner and outer peripheries of said body, and a second pair of annular ribs triangular in cross-section projecting from the opposite ends of said body, said triangular ribs being obliquely offset toward the outer periphery of said body to position sides of the triangular ribs for sealing engagement with the outer walls of the grooves throughout the entire extent of said outer walls between the body and the bottoms of the grooves.

9. A gasket according to claim 8 wherein the apex portions of said triangular ribs are molded to define marginal lips which project outwardly with respect to the outer sides of said triangular ribs.

10. A gasket adapted to form a seal between two opposed parts having inwardly facing grooves, said gasket comprising, an annular relatively rigid metal body having end portions receivable in the grooves, and annular ribs triangular in cross-section projecting from said end portions, said triangular ribs being obliquely offset toward the outer periphery of said body to position sides of the triangular ribs for sealing engagement with the outer walls of the grooves throughout the entire extent of said outer walls between the body and the bottoms of the grooves, said ribs comprising resilient packing material molded to the surface of said body.

11. A gasket according to claim 10 wherein the apex portions of said ribs define marginal lips which project outwardly with respect to the outer sides of said ribs.

References Cited in the file of this patent

UNITED STATES PATENTS

| | | |
|---|---|---|
| 2,517,290 | De Moude et al. | Aug. 1, 1950 |
| 2,764,311 | Blackman | Sept. 25, 1956 |
| 2,880,019 | Wurtz et al. | Mar. 31, 1959 |